United States Patent
Wang et al.

(10) Patent No.: US 12,548,757 B2
(45) Date of Patent: Feb. 10, 2026

(54) LAMINATION PROCESS FOR PTFE-BASED ELECTRODE FILMS ON CURRENT COLLECTORS

(71) Applicant: GM GLOBAL TECHNOLOGY OPERATIONS LLC, Detroit, MI (US)

(72) Inventors: Ming Wang, Sterling Heights, MI (US); Mary Gilliam, Farmington Hills, MI (US); Xiaowei Yu, Troy, MI (US); Ryan Curtis Sekol, Grosse Pointe Woods, MI (US); Graham Garner, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 513 days.

(21) Appl. No.: 18/100,199

(22) Filed: Jan. 23, 2023

(65) Prior Publication Data
US 2024/0250233 A1 Jul. 25, 2024

(51) Int. Cl.
*H01M 4/04* (2006.01)
*H01J 37/32* (2006.01)
*H01M 4/62* (2006.01)

(52) U.S. Cl.
CPC ....... *H01M 4/0435* (2013.01); *H01J 37/3277* (2013.01); *H01M 4/0404* (2013.01); *H01M 4/0471* (2013.01); *H01M 4/623* (2013.01)

(58) Field of Classification Search
CPC ............. H01M 4/0435; H01M 4/0404; H01M 4/0471; H01M 4/623; H01M 4/139; H01J 37/3277; Y02E 60/10
See application file for complete search history.

(56) References Cited

U.S. PATENT DOCUMENTS

| | | | |
|---|---|---|---|
| 2005/0064096 A1* | 3/2005 | Kurihara | H01M 4/0404 252/182.1 |
| 2009/0092903 A1* | 4/2009 | Johnson | H01M 4/1391 429/322 |
| 2017/0058389 A1* | 3/2017 | Gayden | H01M 4/0404 |
| 2017/0288211 A1* | 10/2017 | Zhamu | H01M 4/386 |
| 2017/0309888 A1* | 10/2017 | Yu | H01M 4/139 |
| 2018/0138515 A1* | 5/2018 | Mesuda | H01M 4/0404 |
| 2019/0027777 A1* | 1/2019 | Lee | H01M 50/609 |
| 2019/0139714 A1* | 5/2019 | Shin | H01G 11/04 |
| 2021/0193986 A1* | 6/2021 | Gayden | H01M 10/0404 |
| 2021/0344004 A1* | 11/2021 | Liu | H01M 4/525 |
| 2022/0271267 A1* | 8/2022 | Mashimo | H01M 4/0435 |

* cited by examiner

*Primary Examiner* — Jeffrey T Carley
*Assistant Examiner* — Jose K Abraham

(57) ABSTRACT

A method for fabricating an electrode for a battery cell includes supplying a first electrode film from a first roll. The first electrode film comprises an active material for exchanging lithium ions and a binder. The method includes treating a first side of the first electrode film using a first plasma treatment system; supplying a current collector, and heating and pressing the first side of the first electrode film to a first side of the current collector together using first and second rollers.

18 Claims, 7 Drawing Sheets

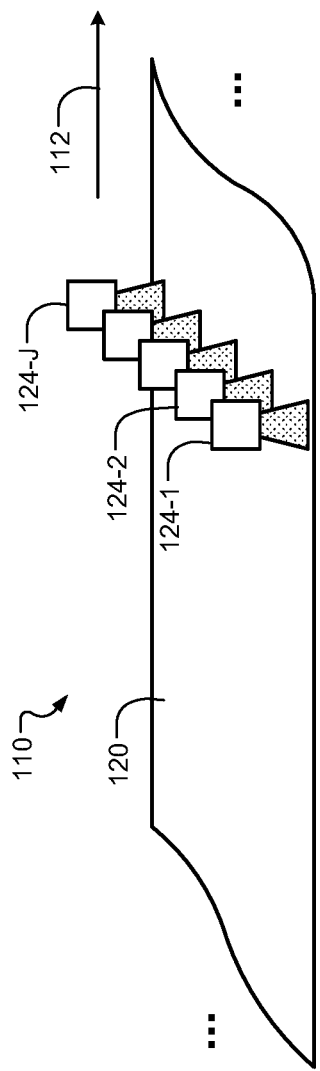
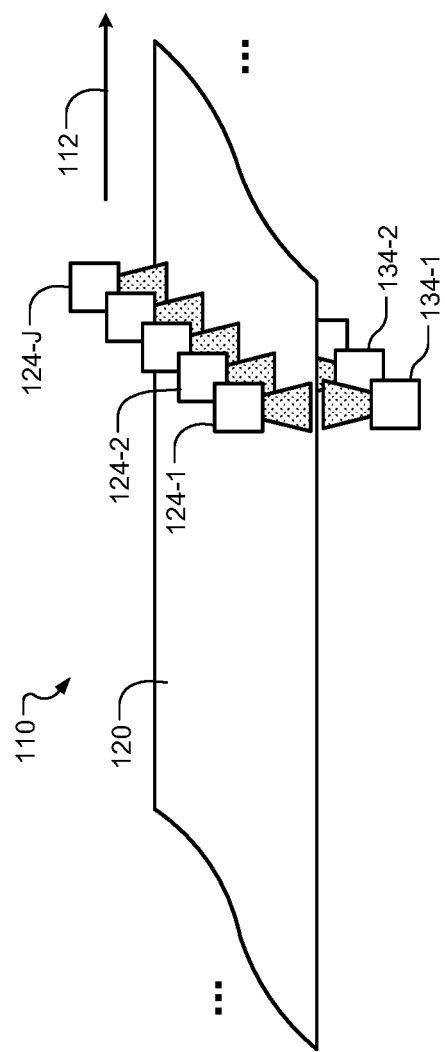

LAMINATION PROCESS FOR PTFE-BASED ELECTRODE FILMS ON CURRENT COLLECTORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to methods for manufacturing electrodes for battery cells, and more particularly to methods for binder-free lamination of PTFE-based electrode films on current collectors.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving.

Manufacturers of EVs are pursuing increased power density to increase the range of the EVs. Lithium-ion batteries (LIB) are currently used in battery systems due to their high power density. Each of the battery cells includes a stack of anode electrodes, cathode electrodes, and separators. The cathode electrodes include a cathode coating arranged on a cathode current collector. The anode electrodes include an anode coating arranged on an anode current collector.

Solvent-free manufacturing of lithium-ion battery (LIB) electrodes lowers manufacturing cost and reduces environmental impact (due to less energy consumption). The factory footprint is also smaller since solvent recovery systems are not required.

SUMMARY

A method for fabricating an electrode for a battery cell includes supplying a first electrode film from a first roll. The first electrode film comprises an active material for exchanging lithium ions and a binder. The method includes treating a first side of the first electrode film using a first plasma treatment system; supplying a current collector; and heating and pressing the first side of the first electrode film to a first side of the current collector together using first and second rollers.

In other features, the method includes supplying a second electrode film from a second roll; and treating a first side of the second electrode film using a second plasma treatment system. The heating and pressing comprises heating and pressing the first side of the first electrode film to the first side of the current collector and the first side of the second electrode film to a second side of the current collector using the first and second rollers.

In other features, the method includes treating the first side and the second side of the current collector using a third plasma treatment system prior to the heating and pressing. The binder comprises polytetrafluoroethylene (PTFE). The heating and pressing of the first electrode film and the current collector is performed without conductive adhesive. The first and second rollers are heated to a temperature in a range from 80° C. to 260° C. The first and second rollers apply pressure to the first electrode film and the current collector in a range from 1 to 20 MPa.

In other features, the method includes moving the first electrode film between electrodes of the first plasma treatment system; moving the first electrode film adjacent to electrodes of the first plasma treatment system; and moving the first electrode film adjacent to plasma jets of the first plasma treatment system.

In other features, the first plasma treatment system uses one or more plasma gases selected from a group consisting of inert gas, air, molecular nitrogen (N2), molecular hydrogen (H2), molecular oxygen (O2), and carbon dioxide (CO2). The first plasma treatment system uses one or more precursors. The one or more precursors are selected from a group consisting of a metal organic compound, a dipodal alkoxysilane, an alkoxysilane, a fluorocarbon gas, a fluorocarbon vapor, a fluorocarbon alcohol, and water vapor. The one or more precursors are delivered as one or more of a vapor, an aerosol, and a liquid. The one or more precursors are one of injected into plasma generated by the first plasma treatment system; and supplied onto the first side of the first electrode film prior to exposure to the plasma generated by the first plasma treatment system.

In other features, the one or more precursors create an interfacial coupling layer between the first side of the first electrode film and the first side of the current collector.

A method for fabricating an electrode for a battery cell includes supplying a first electrode film from a first roll. The first electrode film comprises an active material for exchanging lithium ions and a binder comprising polytetrafluoroethylene (PTFE). The method includes treating a first side of the first electrode film using a first plasma treatment system; supplying a current collector; supplying a second electrode film from a second roll; treating a first side of the second electrode film using a second plasma treatment system; and heating and pressing the first side of the first electrode film to the first side of the current collector and the first side of the second electrode film to a second side of the current collector using a first roller and a second roller. The first roller and the second roller are heated to a temperature in a range from 80° C. to 260° C. The first roller and the second roller apply pressure to the first electrode film, the second electrode film, and the current collector in a range from 1 to 20 MPa.

In other features, the method includes treating the first side and the second side of the current collector using a third plasma treatment system prior to the heating and pressing. At least one of the first plasma treatment system, the second plasma treatment system, and the third plasma treatment system uses precursor. The first plasma treatment system and the second plasma treatment system supply precursor onto the first electrode film.

In other features, the method includes moving the first electrode film between electrodes of the first plasma treatment system and the second plasma treatment system; moving the first electrode film adjacent to electrodes of the first plasma treatment system and the second plasma treatment system; and moving the first electrode film adjacent to plasma jets of the first plasma treatment system and the second plasma treatment system.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of an example of a plasma treatment system for treating a surface of the current collector and/or electrode film according to the present disclosure;

FIG. 1B is a perspective view of an example of a plasma treatment system for treating both surfaces of the current collector according to the present disclosure;

In the drawings, reference numbers may be reused to identify similar and/or identical elements.

DETAILED DESCRIPTION

Figure 2A:
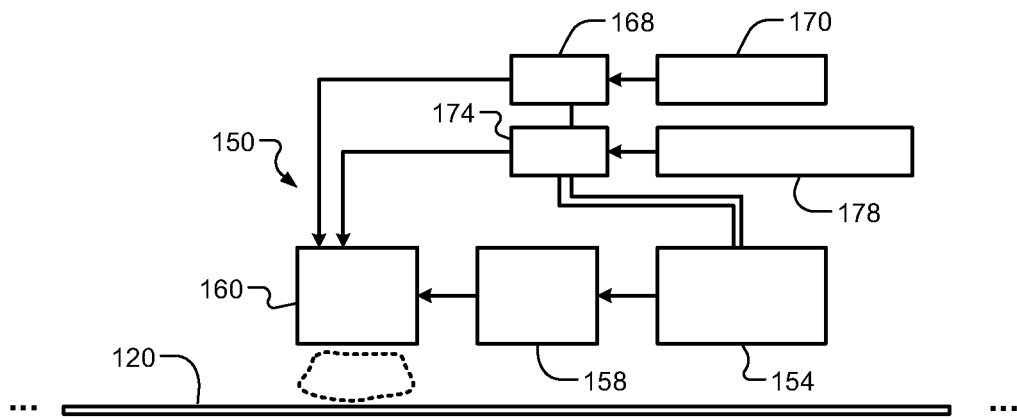
FIGS. 2A and 2B are functional block diagrams of an example of a control system configured to supply RF power, plasma gas, and/or precursor to plasma jets according to the present disclosure.

Electrodes can be produced using an N-methyl-2-pyrrolidone (NMP)-based wet process. This approach is expensive and uses NMP, which is an environmental pollutant. Increased cost is also associated a drying line, a solvent recovery system, and energy consumption and factory space for these components. When manufacturing thick electrodes, the electrodes tend to have poor mechanical properties due to a binder gradient that develops during drying. In addition, facial contact of a binder blocks ion transportation.

Some dry electrode manufacturing processes use fibrillated PTFE as a binder to create free-standing electrodes from powders. Alcohol-based solvent mixing or dry powder mixing can be used for dispersion of PTFE. PTFE fibrillation occurs under heat and shear during processing (mixing, coating and calendaring) to that free-standing electrodes can be created. An adhesive coating is needed to stick free-standing electrode film to the current collector. Conductive additives also need to be added in the adhesive to improve the interfacial electronic conductivity.

A method for manufacturing an electrode according to the present disclosure bonds a PTFE-based electrode film onto a current collector using plasma treatment and hot calendaring. The PTFE-based electrode film and the current collector are chemically modified by the plasma and then laminated using hot calendaring.

In some examples, a plasma treatment system uses cold atmospheric plasma jets to treat the electrode film and/or the current collector. In some examples, the plasma jets are configured in a line or an array extending across a width of the substrate. In some examples, a plasma power source includes a pulsed direct current (DC) source or alternating current (AC) source. In some examples, the pulsed DC source or the AC source operate at a frequency in a range from low to microwave frequencies.

In some examples, plasma treatment is performed on the current collector to clean and modify a surface of the current collector using plasma jets arranged on one or both sides of the current collector.

In the description that follows, FIGS. 1A to 8 show various examples of plasma treatments of a substrate such as an electrode film or a current collector. FIG. 9 illustrates a roll-to-roll process for laminating electrode film onto one or both surfaces of a current collector using plasma treatment and hot calendaring without the need for an adhesive coating to glue the electrode film onto the current collector.

Referring now to FIGS. 1A to 2, a plasma treatment system 110 for performing plasma treatment on a substrate 120 is shown. In some examples, the substrate 120 comprises an electrode film including active material, a dry binder such as PTFE, one or more optional conductive additives and/or other dry materials. In some examples, the electrode comprises an anode electrode or a cathode electrode. In some examples, the anode electrode and the cathode electrode exchange lithium ions.

In FIG. 1A, the substrate 120 is fed through the plasma treatment system 110 in a direction indicated by arrow 112. A plurality of plasma jets 124-1, 124-2, . . . , and 124-J direct plasma gas onto a first surface of the substrate 120 to treat the surface of the moving substrate. In FIG. 1B, the substrate 120 is fed through the plasma treatment system 110 in a direction indicated by arrow 112. A plurality of plasma jets 124-1, 124-2, . . . , and 124-J direct plasma gas onto a first surface of the substrate 120. A plurality of plasma jets 134-1, 134-2, . . . , and 134-J direct plasma gas onto a second surface of the substrate 120.

Figure 2B:
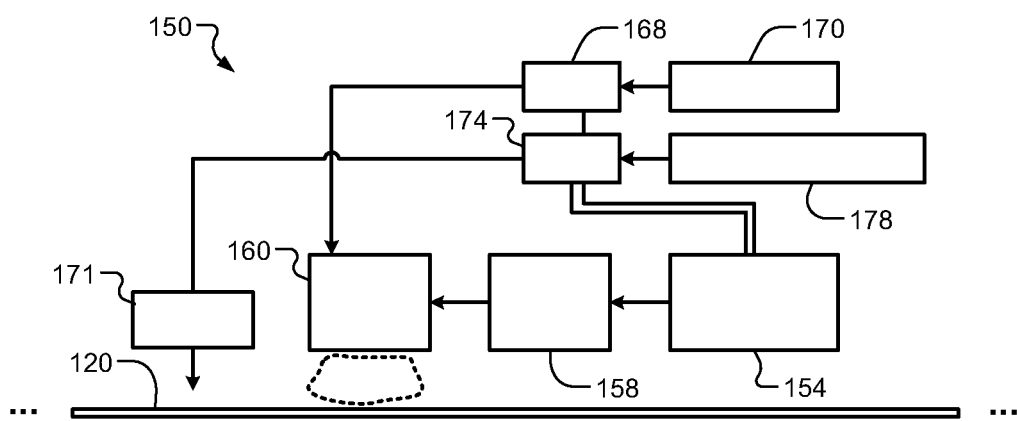

In FIGS. 2A and 2B, a control system 150 includes a controller 154 configured to supply power from a power source 158 to plasma jets 160. The plasma jets 160 receive plasma gas and/or precursor gas from a gas source 170 and a precursor source 178, respectively. The controller 154 is configured to control valves 168 and 174 to control output of the gas source 170 and the precursor source 178. In FIG. 2A, the precursor is applied through the plasma jets or immediately adjacent to and upstream from the plasma jets. In FIG. 2B, a nozzle 171 may be used to apply the precursor onto the substrate 120 upstream from the plasma jets. In some examples, the precursor may be in the form of a spray or aerosol. When applying upstream from the plasma jets, more of the organic content is preserved, which may enhance adhesion to the binder through organic reactions, intermolecular forces, and other adhesion mechanisms.

Figure 3:
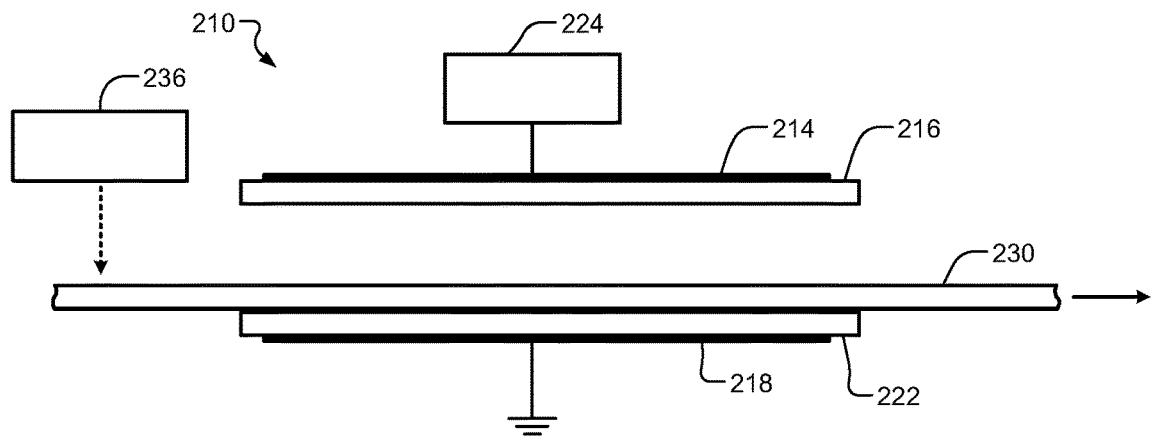
FIGS. 3 to 5 are side cross-sectional views of examples of plasma treatment systems according to the present disclosure.
Figure 4:
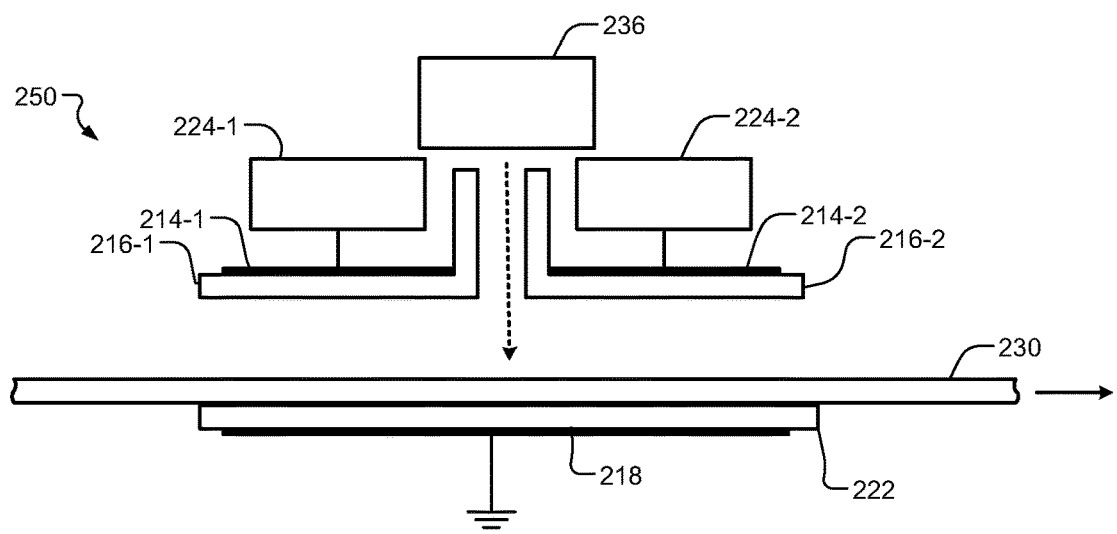
Figure 5:
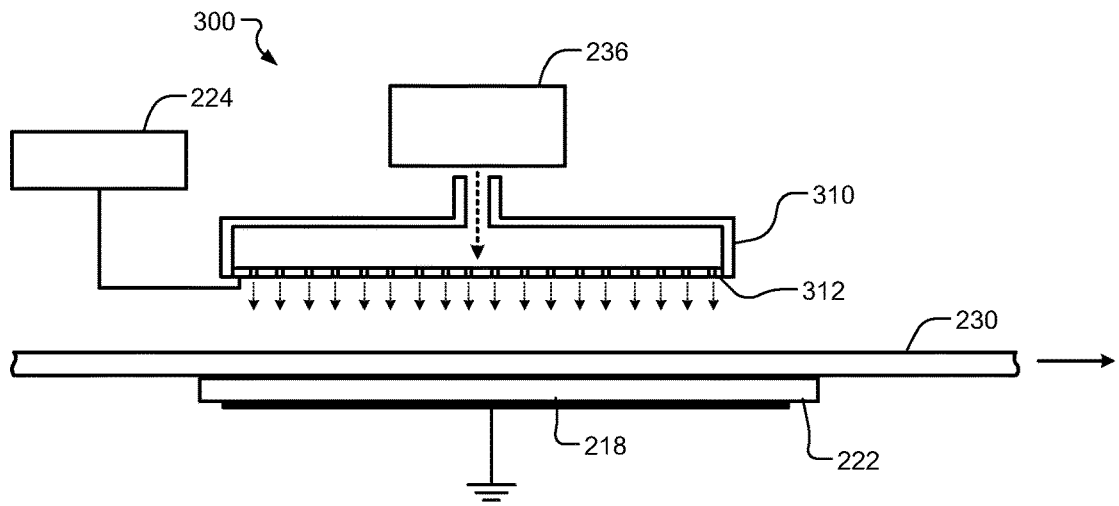

Referring now to FIGS. 3 to 5, a plasma treatment system 210 is shown. In FIG. 3, a substrate 230 (e.g., the electrode film and/or the current collector) is located in a space between plasma electrodes. Dielectric barrier layers 216 and 222 may be arranged between the substrate 230 and the electrodes 214 and 218. A power source 224 (such as an AC or pulsed DC source) supplies RF power to the electrode 214 and the electrode 218 is grounded. A precursor source 236 supplies precursor as a spray, aerosol or vapor between the electrodes 214 and 218. Other gases may also be supplied to support the plasma. The substrate 230 passes between electrodes 214 and 218 and is treated by the plasma.

In FIG. 4, another plasma treatment system 250 is shown. The substrate 230 passes through a space between plasma electrodes. The substrate 230 passes between electrodes 214-1, 214-2 and an electrode 218. Dielectric barrier layers 216-1, 216-2 and 222 may be arranged between the substrate 230 and the electrodes 214-1, 214-2, and 218. Power sources 224-1 and 224-2 (e.g., AC or pulsed DC power sources) supply RF power to the electrodes 214-1 and 214-2 and the electrode 218 is grounded. The precursor source 236 supplies precursor as a spray, aerosol or vapor between the electrodes 216-1 and 216-2 and between the electrodes 216-1, 216-2 and the electrode 218. The substrate 230 passes between the electrodes 216-1, 216-2 and the electrode 218 and is treated by the plasma.

In FIG. 5, another plasma treatment system 300 is shown. A gas distribution device 310 includes a perforated plate 312 with gas through holes. The precursor source 236 supplies precursor to the gas distribution device 310. The power source 224 supplies power to the perforated plate 312 or to a conductor arranged on or in the perforated plate 312. The substrate 230 is also located in a space between plasma electrodes. The substrate 230 passes between the gas distribution device 310 and the electrode 218 and is treated by the plasma.

Figure 6A:
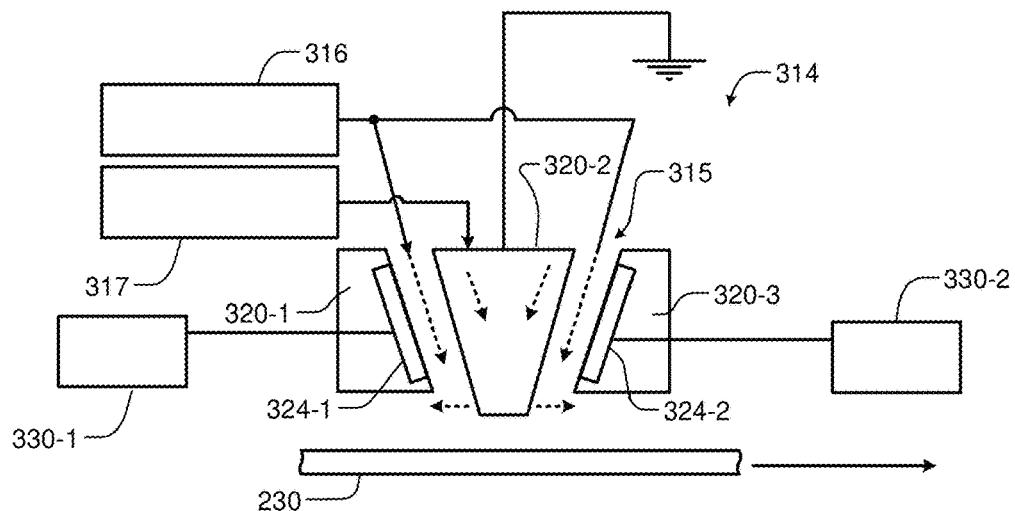
FIGS. 6A to 7B are side cross-sectional views of examples of plasma treatment systems using one or more precursors according to the present disclosure.
Figure 6B:
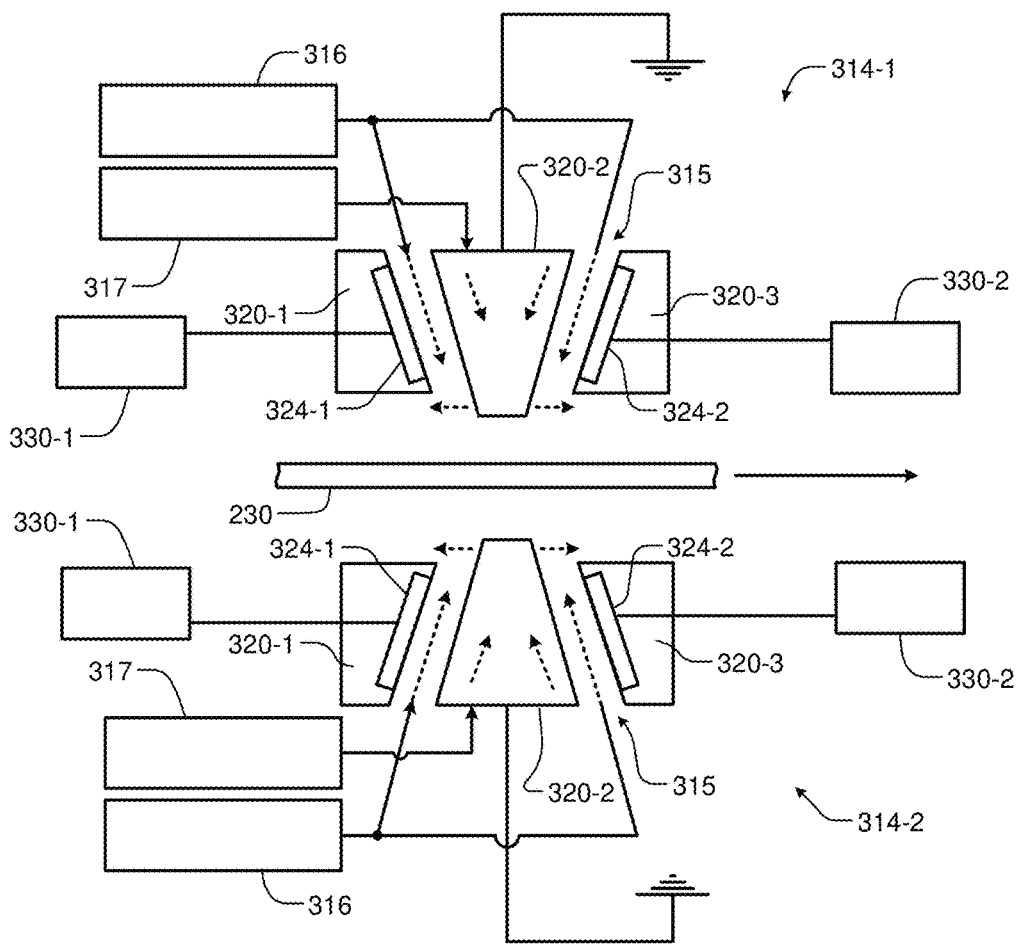

Referring now to FIGS. 6A and 6B, the plasma treatment system supplies plasma onto the surface of the substrate. In FIGS. 6A and 6B, the plasma treatment system includes a dielectric barrier discharge (DBD) system 314 configured to treat the substrate 230. In FIG. 6A, the DBD system 314 includes a gas source 316 and/or a precursor source 318 to supply plasma gas and/or precursor gas. The gas source 316 supplies plasma gas to cavities 315 defined between gas directing members 320-1, 320-2 and 320-3 of the DBD system 314.

If used, a precursor gas source 317 supplies the precursor gas to the gas directing member 320-2 arranged between the gas directing members 320-1 and 320-3. Electrodes 324-1 and 324-2 are arranged in the gas directing members 320-1 and 320-3. AC sources 330-1 and 330-2 supply power to the electrodes 324-1 and 324-2 and the gas distributing member 320-2 may be grounded. The substrate 230 passes by an outlet of the gas directing members 320-1, 320-2 and 320-3 and is treated by the plasma. In FIG. 6B, DBD systems 314-1 and 314-2 are arranged on both sides of the substrate 230.

Figure 7A:
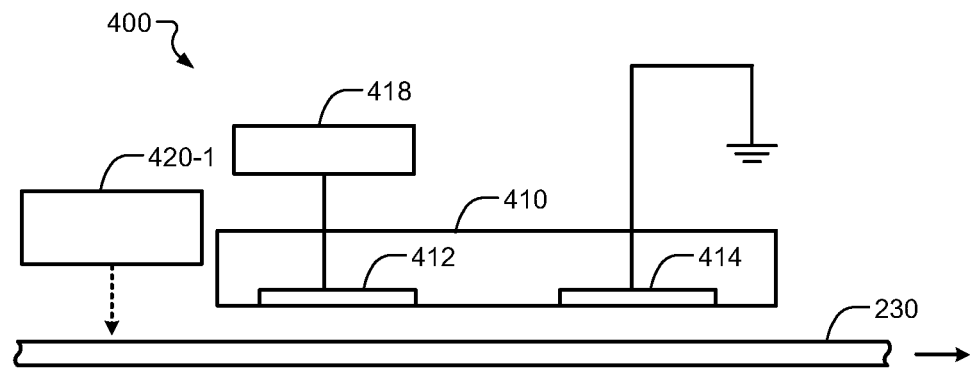
Figure 7B:
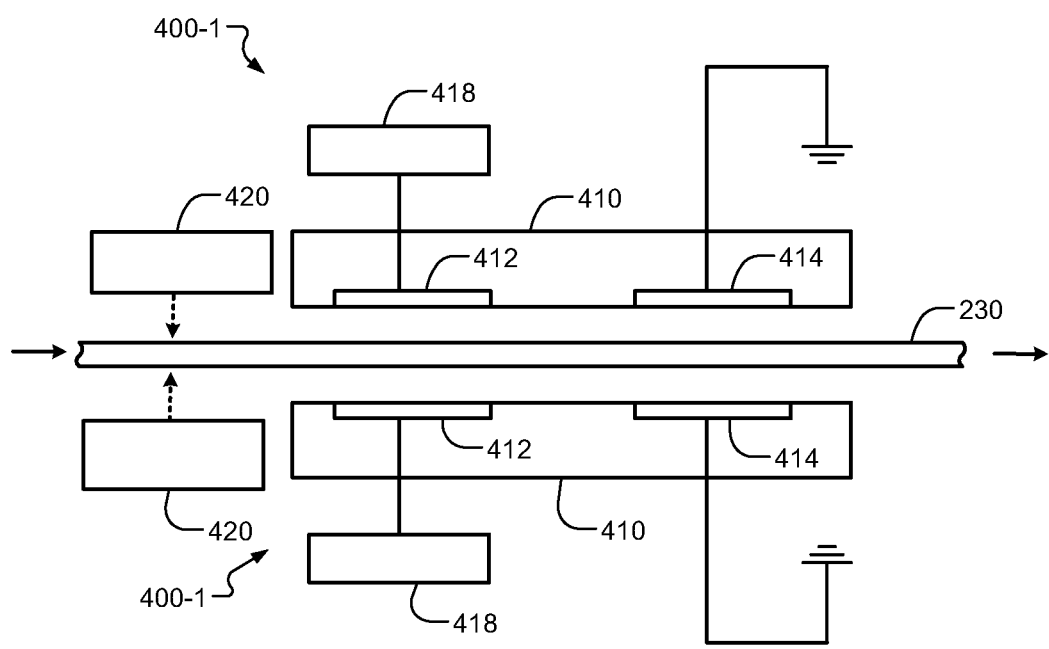

Referring now to FIGS. 7A and 7B, a plasma treatment system 400 includes electrodes that are enclosed in dielectric and the plasma is generated adjacent to and outside of the dielectric (where the substrate 230 passes). In FIG. 7A, a plasma treatment system 400 includes a dielectric material 410 including embedded electrodes 412 and 414. An AC source 418 supplies power to the embedded electrode 412 and the embedded electrode 414 is grounded. A precursor source supplies precursor between the substrate 230 and the dielectric material 410. In FIG. 7B, a plasma treatment system 400-1 is arranged on one side of the substrate 230 and a plasma treatment system 400-2 is arranged on the other side of the substrate 230.

Figure 8:
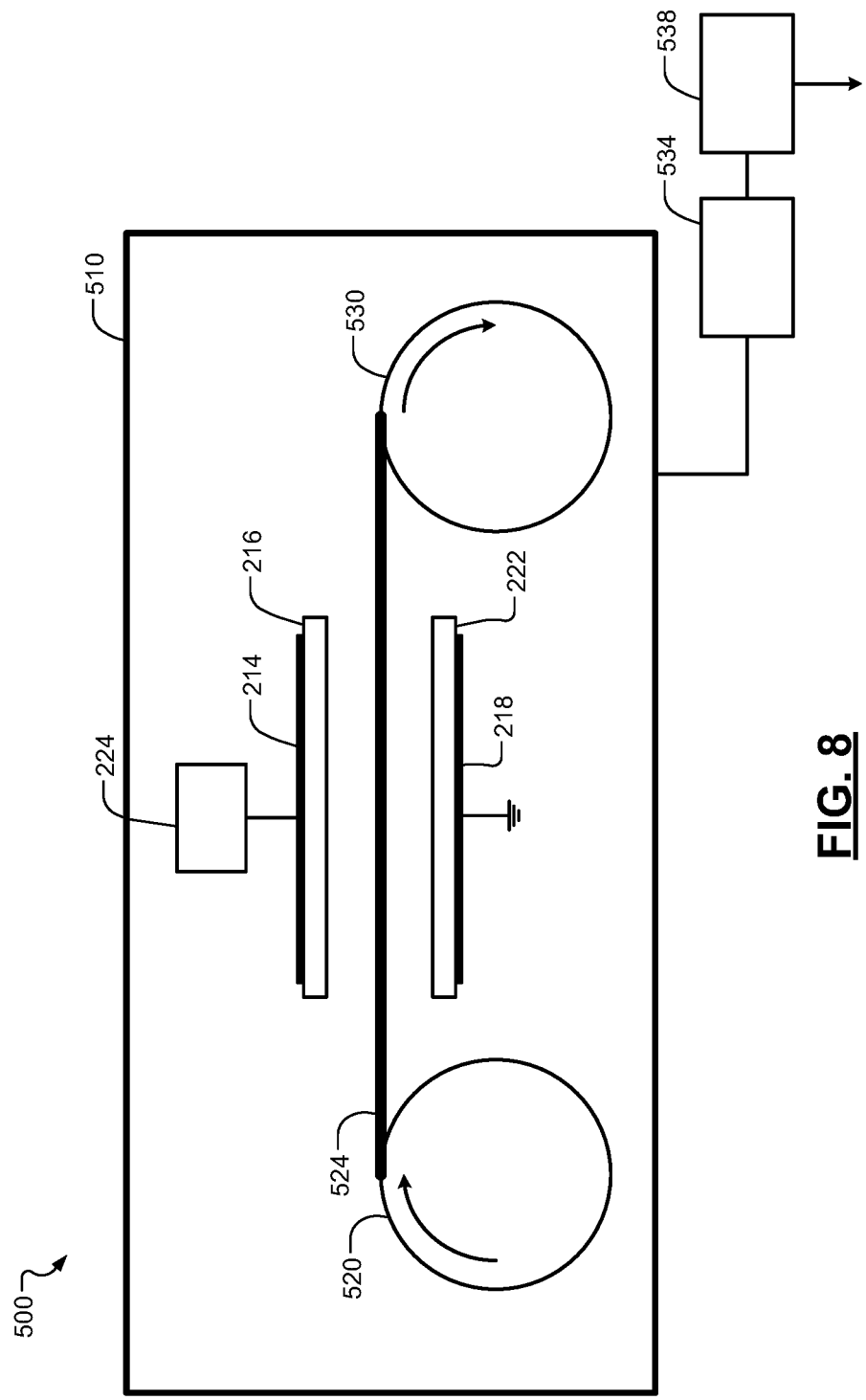
FIG. 8 is a side cross-sectional view of an example of a vacuum-based plasma treatment systems according to the present disclosure.
Figure 9:
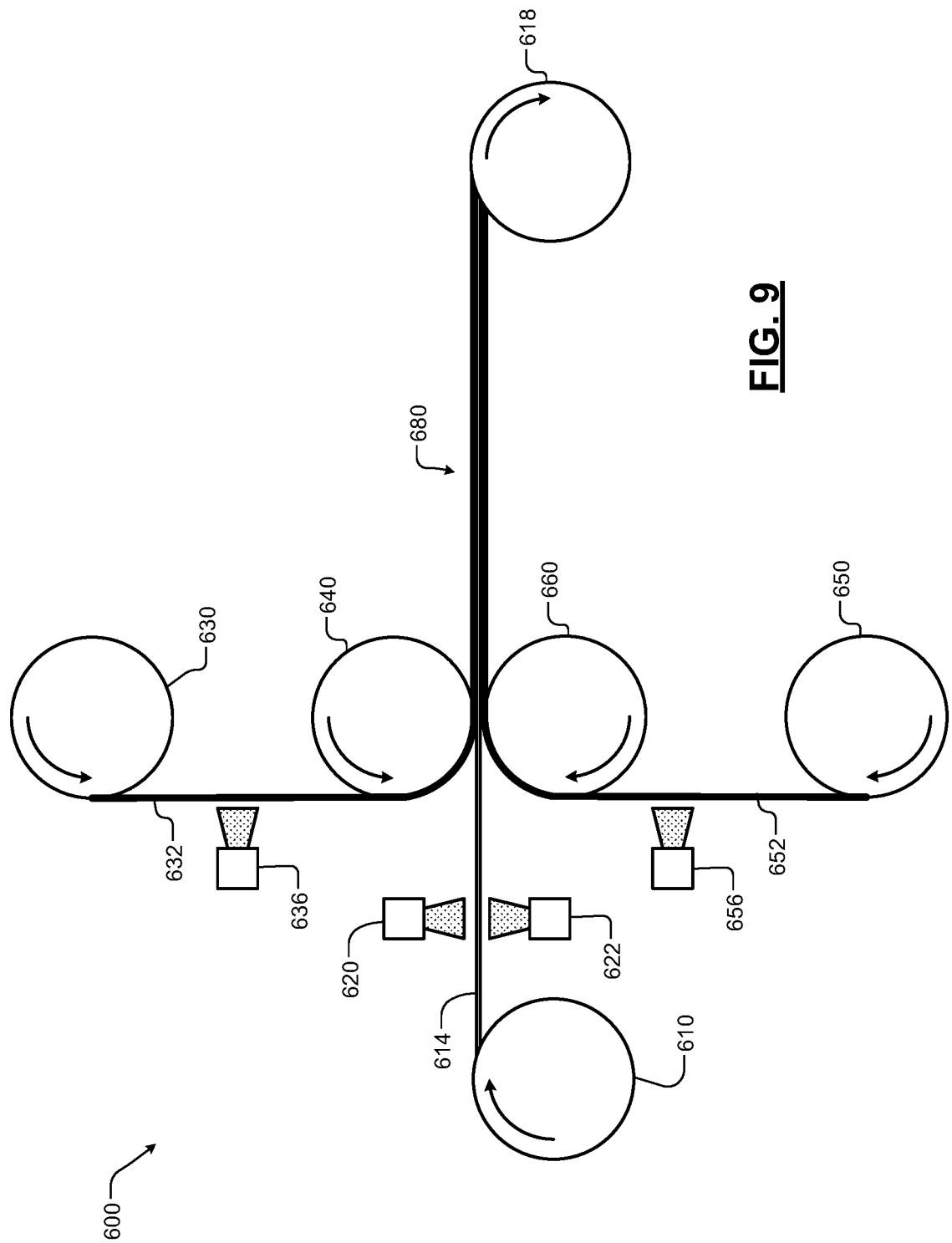
FIG. 9 illustrates an example of a method for manufacturing an electrode using a plasma treatment system according to the present disclosure.

Referring now to FIG. 8, a low microwave plasma treatment system 500 performs plasma treatment of the substrate. For example, a double-sided plasma treatment can be performed in a process chamber 510 operating at vacuum. A first roll 520 supplies the substate 524 between the electrodes 214 and 218 while the AC source supplies RF power to the electrode 214. The substrate is treated and then stored on a roll 530. A valve 534 and a pump 538 may be used to control pressure within the process chamber 510. As can be appreciated, other plasma treatment systems described herein can be used in this process.

Referring now to FIG. 9, a roll-to-roll process 600 may be used to treat electrodes and/or current collectors prior to lamination using calendaring. A first roll 610 supplies a current collector 614 between optional plasma jets 620 and 622 (or other plasma treatment systems described herein) for treating surfaces of the current collector 614 before the current collector 614 passes through rollers 640 and 660. A roll 630 supplies a first electrode film 632. A plasma jet 636 performs plasma treatment on one side of a first electrode film 632 (facing the current collector 614) and then the first electrode film 632 is supplied between the rollers 640 and 660.

A roll 650 supplies a second electrode film 652. A plasma jet 656 performs plasma treatment on one side of the second electrode film 652 and then the second electrode film 652 is supplied between the rollers 640 and 660. The rollers 640 and 660 perform hot calendaring (e.g., heating and pressing the first electrode film 632, the current collector 614, and the second electrode film 652 together). After hot calendaring, a laminated electrode and current collector are stored on a roll 618.

In some examples, the rollers 640 and 660 are heated to a temperature in a range from 80° C. to 260° C. In some examples, the rollers 640 and 660 apply pressure in a range from 1 to 20 MPa.

In some examples, the plasma electrodes and/or the array of plasma jets have the same width (+/−5%) as the electrode film and/or the current collector.

In some examples, the plasma gas includes an inert gas, air, molecular nitrogen ($N_2$), molecular hydrogen ($H_2$), molecular oxygen ($O_2$), carbon dioxide ($CO_2$), and/or a mixtures thereof. In some examples, the inert gas is selected from a group consisting of argon (Ar) and helium (He).

In some examples, a plasma precursor or mixture of precursors is added to the plasma treatment system or as a second plasma processing step for either the electrode film and/or the current collector or both substrates. The precursor creates an interfacial coupling layer between the electrode film containing polymeric binder and the metal current collector to improve the adhesion.

In some examples, the precursor is delivered as a vapor, aerosol, or liquid. In some examples, the precursor is injected into the plasma upstream from the plasma generator. In other examples, the precursor is directed onto a surface of the substrate prior to plasma exposure.

In some examples, the precursor comprises a metal organic compound. In some examples, the precursor comprises an organosilane. In some examples, the organosilane includes an alkoxysilane with organic functional group. Examples of organic functional groups include fluorocarbon, amine, epoxy, acrylate, and others.

In some examples, the precursor is selected from a group consisting of a metal organic compound, a dipodal alkoxysilane with an organic group bonded to a silicon atom on each end of the chain, an alkoxysilane, and combinations thereof. In some examples, the precursor is selected from a group consisting of a pre-hydrolyzed metal organic compound (e.g., alkoxysilanes), fluorocarbon gas or vapor, fluorocarbon alcohol, and/or water vapor.

In some examples, the current collector is selected from a group consisting of aluminum foil, copper foils or other suitable materials.

Benefits of the plasma treatment systems described herein include reducing cost by eliminating adhesive coatings. The plasma treatment process is a simple and easily controlled during manufacturing. The process eliminates the usage of organic solvent and the solvent drying and recovery processes. The plasma treatment system is also not limited by volatile organic compound (VOC) regulation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for fabricating an electrode for a battery cell, comprising:
supplying a first electrode film from a first roll, wherein the first electrode film comprises an active material for exchanging lithium ions and a binder;
treating a first side of the first electrode film using a first plasma treatment system;
supplying a current collector;
heating and pressing the first side of the first electrode film to a first side of the current collector together using first and second rollers;
supplying a second electrode film from a second roll; and
treating a first side of the second electrode film using a second plasma treatment system,
wherein the heating and pressing comprises heating and pressing the first side of the first electrode film to the first side of the current collector and the first side of the second electrode film to a second side of the current collector using the first and second rollers.

2. The method of claim 1, further comprising treating the first side and the second side of the current collector using a third plasma treatment system prior to the heating and pressing.

3. The method of claim 1, wherein the binder comprises polytetrafluoroethylene (PTFE).

4. The method of claim 1, wherein the heating and pressing of the first electrode film and the current collector is performed without conductive adhesive.

5. The method of claim 1, wherein the first and second rollers are heated to a temperature in a range from 80° C. to 260° C.

6. The method of claim 1, wherein the first and second rollers apply pressure to the first electrode film and the current collector in a range from 1 to 20 MPa.

7. The method of claim 1, further comprising one of:
moving the first electrode film between electrodes of the first plasma treatment system;
moving the first electrode film adjacent to electrodes of the first plasma treatment system; and
moving the first electrode film adjacent to plasma jets of the first plasma treatment system.

8. The method of claim 1, wherein the first plasma treatment system uses one or more plasma gases selected from a group consisting of inert gas, air, molecular nitrogen ($N_2$), molecular hydrogen ($H_2$), molecular oxygen ($O_2$), and carbon dioxide ($CO_2$).

9. The method of claim 1, wherein the first plasma treatment system uses one or more precursors.

10. The method of claim 9, wherein the one or more precursors are selected from a group consisting of a metal organic compound, a dipodal alkoxysilane, an alkoxysilane, a fluorocarbon gas, a fluorocarbon vapor, a fluorocarbon alcohol, and water vapor.

11. The method of claim 9, wherein the one or more precursors are delivered as one or more of a vapor, an aerosol, and a liquid.

12. The method of claim 9, wherein the one or more precursors are one of:
injected into plasma generated by the first plasma treatment system; and
supplied onto the first side of the first electrode film prior to exposure to the plasma generated by the first plasma treatment system.

13. The method of claim 9, wherein the one or more precursors create an interfacial coupling layer between the first side of the first electrode film and the first side of the current collector.

14. A method for fabricating an electrode for a battery cell, comprising:
supplying a first electrode film from a first roll, wherein the first electrode film comprises an active material for exchanging lithium ions and a binder comprising polytetrafluoroethylene (PTFE);
treating a first side of the first electrode film using a first plasma treatment system;
supplying a current collector;
supplying a second electrode film from a second roll;
treating a first side of the second electrode film using a second plasma treatment system; and
heating and pressing the first side of the first electrode film to the first side of the current collector and the first side of the second electrode film to a second side of the current collector using a first roller and a second roller,
wherein the first roller and the second roller are heated to a temperature in a range from 80° C. to 260° C., and
wherein the first roller and the second roller apply pressure to the first electrode film, the second electrode film, and the current collector in a range from 1 to 20 MPa.

15. The method of claim 14, further comprising treating the first side and the second side of the current collector using a third plasma treatment system prior to the heating and pressing.

16. The method of claim 15, wherein at least one of the first plasma treatment system, the second plasma treatment system, and the third plasma treatment system uses precursor.

17. The method of claim 14, wherein the first plasma treatment system and the second plasma treatment system supply precursor onto the first electrode film.

18. The method of claim 14, further comprising one of:
moving the first electrode film between electrodes of the first plasma treatment system and the second plasma treatment system;
moving the first electrode film adjacent to electrodes of the first plasma treatment system and the second plasma treatment system; and
moving the first electrode film adjacent to plasma jets of the first plasma treatment system and the second plasma treatment system.

* * * * *